United States Patent
Grunow et al.

(10) Patent No.: US 6,824,195 B2
(45) Date of Patent: Nov. 30, 2004

(54) AUTOMOBILE CONVERTIBLE ROOF SYSTEM HAVING A FLAT-FOLD BOOT COVER

(75) Inventors: Carol Grunow, Troy, MI (US); Rhynhardt Weimer, Grosse Ile, MI (US)

(73) Assignee: ASC Incorporated, Southgate, MI (US)

( * ) Notice: Subject to any disclaimer, the term of this patent is extended or adjusted under 35 U.S.C. 154(b) by 0 days.

(21) Appl. No.: 10/202,261

(22) Filed: Jul. 24, 2002

(65) Prior Publication Data

US 2004/0201241 A1 Oct. 14, 2004

(51) Int. Cl.$^7$ .................................................. B60J 11/00
(52) U.S. Cl. ........................... 296/136.05; 296/136.01
(58) Field of Search ..................... 296/136.05, 136.01, 296/136.09, 136; 150/166

(56) References Cited

U.S. PATENT DOCUMENTS

| | | |
|---|---|---|
| D183,044 S | 6/1958 | Glowacke |
| 3,170,726 A | 2/1965 | Lystad |
| 3,180,676 A | 4/1965 | Payne |
| 3,223,446 A | 12/1965 | Coppock et al. |
| 4,044,702 A | 8/1977 | Jamieson |
| 4,136,630 A | 1/1979 | Fraser |
| 4,487,146 A | 12/1984 | Parmentier |
| 4,512,606 A | 4/1985 | Trostle et al. |
| 4,625,671 A | 12/1986 | Nishimura |
| 4,668,006 A | 5/1987 | Wagner |
| 4,669,774 A | 6/1987 | Crain |
| 4,858,854 A | 8/1989 | Jacobson |
| 4,901,897 A | 2/1990 | Briggs et al. |
| 4,930,833 A | 6/1990 | Cichoski et al. |
| 5,201,565 A * | 4/1993 | Berardino ............... 296/136.03 |
| 5,311,706 A | 5/1994 | Sallee |
| 5,322,337 A | 6/1994 | Rawlings et al. |
| 5,324,091 A | 6/1994 | Baker |
| 5,743,587 A | 4/1998 | Alexander et al. |
| 5,887,936 A | 3/1999 | Cowsert |
| 5,971,414 A | 10/1999 | Borzage |
| 6,015,184 A | 1/2000 | Ewing et al. |
| 6,161,893 A | 12/2000 | Ewing et al. |

OTHER PUBLICATIONS

Disclosure of permanently contoured boot cover (offered for sale prior to Jul. 2002).
Disclosure of boot cover prototype with uniformly thick interal inserts (shown to customer in Jul. 2000).

* cited by examiner

Primary Examiner—Joseph D. Pape
(74) Attorney, Agent, or Firm—Harness, Dickey & Pierce, P.L.C.

(57) ABSTRACT

A preferred embodiment of an automotive convertible roof system has a flat-fold boot cover. In another aspect of the present invention, the boot cover includes various pliable fabric materials that are laminated together to form an integrated material. A further aspect of the present invention provides that flexible stiffeners be placed between the flexible sheets during the manufacturing process. Still another aspect of the present invention employs flexible stiffeners having a non-uniform thickness, which cause the flexible stiffeners to bend asymmetrically when subjected to a bending load.

56 Claims, 8 Drawing Sheets

AUTOMOBILE CONVERTIBLE ROOF SYSTEM HAVING A FLAT-FOLD BOOT COVER

BACKGROUND AND SUMMARY OF THE INVENTION

The present invention relates in general to automotive convertible roof systems, and more particularly, to a convertible roof system having a flat-folding boot cover.

Automotive convertible roof systems typically have a retractable roof that can be moved from a closed to an open position, thereby exposing a passenger compartment of a vehicle. The fully retracted roof is stored in a storage compartment or a boot well located behind the vehicle's passenger compartment. The stored convertible roof can be hidden from view by covering the storage well with a boot cover that attaches to the vehicle. In addition to concealing the convertible roof, the boot cover also gives the vehicle a more finished and aesthetically appealing appearance.

Various conventional materials and methods of manufacturing have been proposed for constructing a boot cover, including the use of flexible and rigid materials. Boot covers made entirely of flexible materials are generally easier to fold and can be stored more compactly than boot covers constructed of rigid materials. Because the material is flexible, however, it is difficult to control the boot cover's contour when the boot cover is attached to the vehicle. Instead, the boot cover profile will likely be determined by the shape of the underlying convertible roof, which generally produces a less than satisfying boot contour.

Various traditional boot covers have overcome some of the drawbacks associated with constructing a boot cover from flexible materials by using rigid materials. Rigid materials can generally be molded into a variety of shapes, which allows a boot cover to be permanently contoured. Because rigid materials tend to retain their shape, however, boot covers constructed of such material are often difficult to fold and generally do not store as compactly as boot covers constructed of flexible materials.

In an effort to take advantage of the benefits of both rigid and flexible materials, some prior boot cover designs have proposed constructing a boot cover from a combination of flexible and rigid materials. Although the flexible material allows the boot cover to be folded more compactly, those portions of the boot cover comprised of rigid materials generally do not fold flat, which increases the amount of space required for storage. As a consequence, there is a recognized need to develop a convertible boot cover that can achieve and maintain a desired contour when attached to the vehicle, but which will also lie flat and fold compactly when removed from the vehicle for storage.

In accordance with the present invention, a preferred embodiment of an automotive convertible roof system has a flat-fold boot cover. In another aspect of the present invention, the boot cover includes various pliable fabric materials that are laminated together to form an integrated material. A further aspect of the present invention provides that flexible stiffeners be placed between the flexible sheets during the manufacturing process. Still another aspect of the present invention employs flexible stiffeners having a non-uniform thickness, which cause the flexible stiffeners to bend asymmetrically when subjected to a bending load.

The boot cover of the present invention is advantageous over prior designs in that the flexible stiffeners of the present invention support and give the boot cover its desired shape when installed on the vehicle, but return to their original substantially flat shape when the boot cover is removed from the vehicle. This allows the boot cover to be folded into a relatively compact package that requires a minimal amount of storage space. Further areas of applicability of the present invention will become apparent from the detailed description provided hereinafter. It should be understood that the detailed description with specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The following description of the preferred embodiment is merely exemplary in nature and is in no way intended to limit the invention, its application, or uses.

Figure 1:
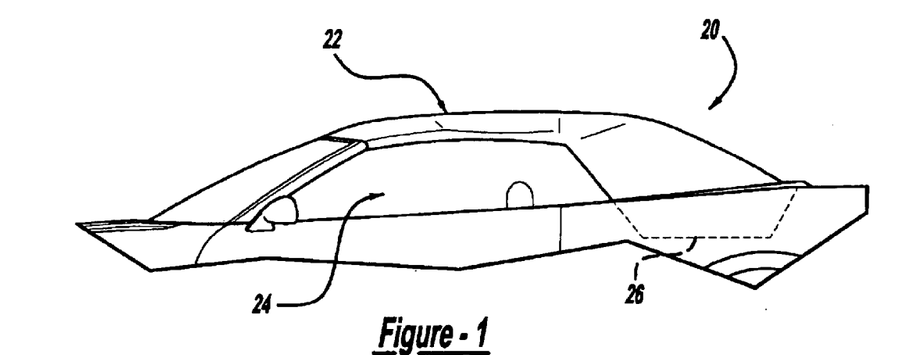
FIG. 1 is a fragmentary, side elevational view showing an automotive vehicle having a preferred embodiment convertible roof system of the present invention, illustrated in a raised position.
Figure 2:
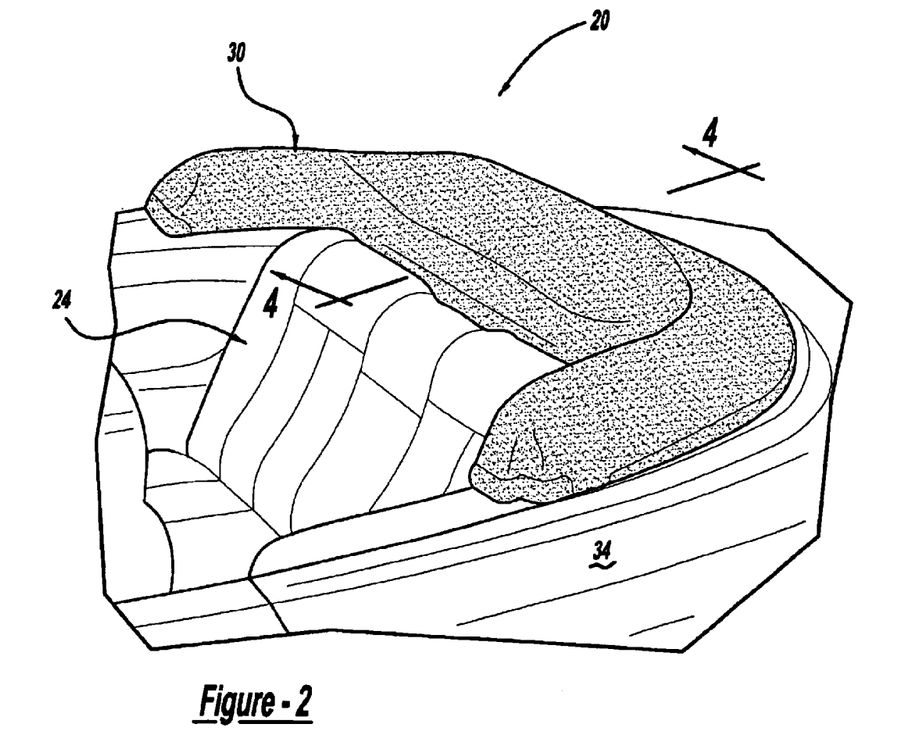
FIG. 2 is a fragmentary, perspective view of the automotive vehicle with the preferred embodiment convertible roof system illustrated in an open or retracted position and a boot cover of the present invention covering the stored roof.
Figure 3:
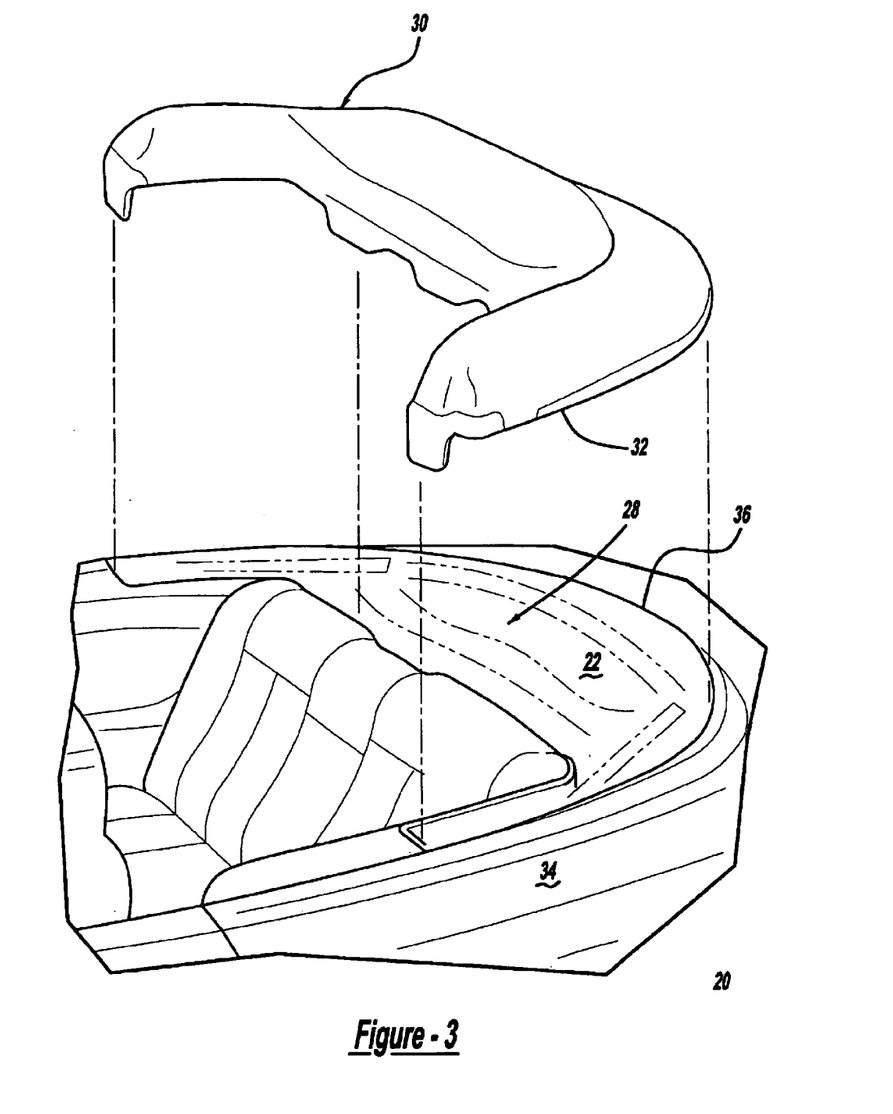
FIG. 3 is a fragmentary, perspective view of the automotive vehicle with the preferred embodiment convertible roof system shown in an open or retracted position with the boot cover shown out of position.

Referring to FIGS. 1–3, an automotive vehicle 20 is shown to have a preferred embodiment convertible roof system of the present invention with a convertible roof 22. Convertible roof 22 is shown in its raised or extended position. Convertible roof 22 may be opened or retracted to expose a passenger compartment 24 of vehicle 20. The fully retracted roof 22 is stored in a storage compartment or boot well 26 that has an upper access opening 28 through which the roof is received. Storage well 26 is positioned behind the vehicle's passenger compartment 24. Convertible roofs, such as those disclosed in the following U.S. patents, can be employed with the present invention: U.S. Pat. No. 6,209, 945 entitled "Folding Top For A Passenger Vehicle, Especially A Passenger Car", which issued to Aydt et al. on Apr. 3, 2001; U.S. Pat. No. 6,139,087 entitled "Kinematic Folding Top For Passenger Cars", which issued to Wolfmaier et al. on Oct. 31, 2000; U.S. Pat. No. 5,903,119 entitled "Convertible Roof Actuation Mechanism", which issued to Laurain et al. on May 11, 1999; and U.S. Pat. No. 5,251,952 entitled "Folding Hood For Motor Vehicles", which issued to Guckel et al. on Oct. 12, 1993; the forgoing patents are incorporated herein by reference.

The convertible roof system includes a boot cover 30, which is used to conceal the stored convertible roof 22 from view and improve the aesthetic appearance of the access opening of storage well 26 when the roof is in its open or retracted position. A peripheral edge 32 of boot cover 30 is attached to a body 34 of vehicle 20 about a perimeter edge 36 of boot well 26. Boot cover 30 is attached to vehicle body 34 using any of variety of fastening methods, including snaps, hook and loop fasteners, clips, or any other suitable method.

Figure 4:
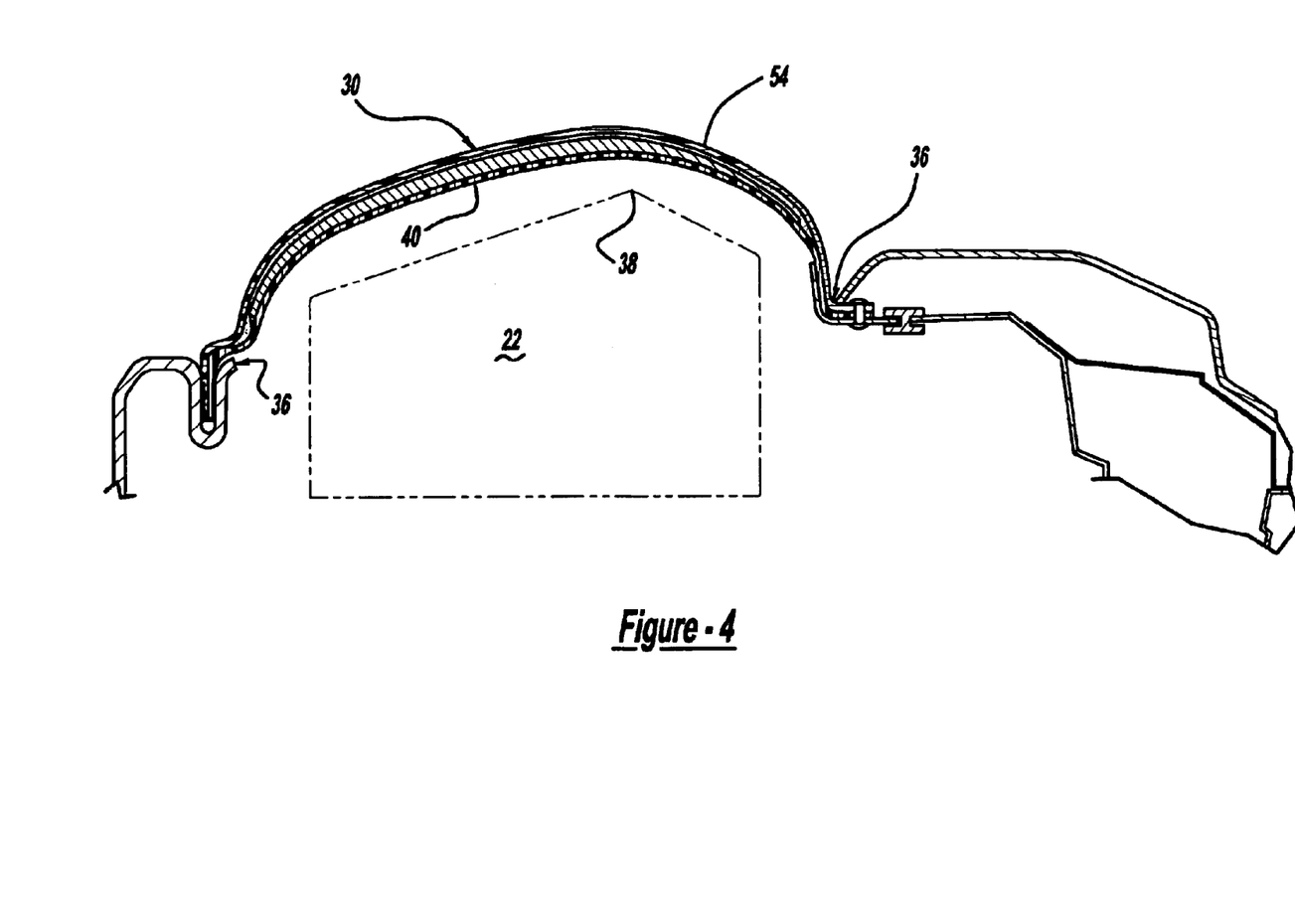
FIG. 4 is a cross sectional view taken along line 4—4 of FIG. 2, showing the preferred embodiment boot cover attached to the vehicle.

Referring to FIG. 4, stored convertible roof 22 has an uppermost extremity 38 that extends above the point at which boot 30 attaches to perimeter edge 36 of boot well 26. As a result, boot cover 30 must curve upward in order for a bottom surface 40 of boot cover 30 to clear the upper extremity of the stored convertible roof.

Figure 5:
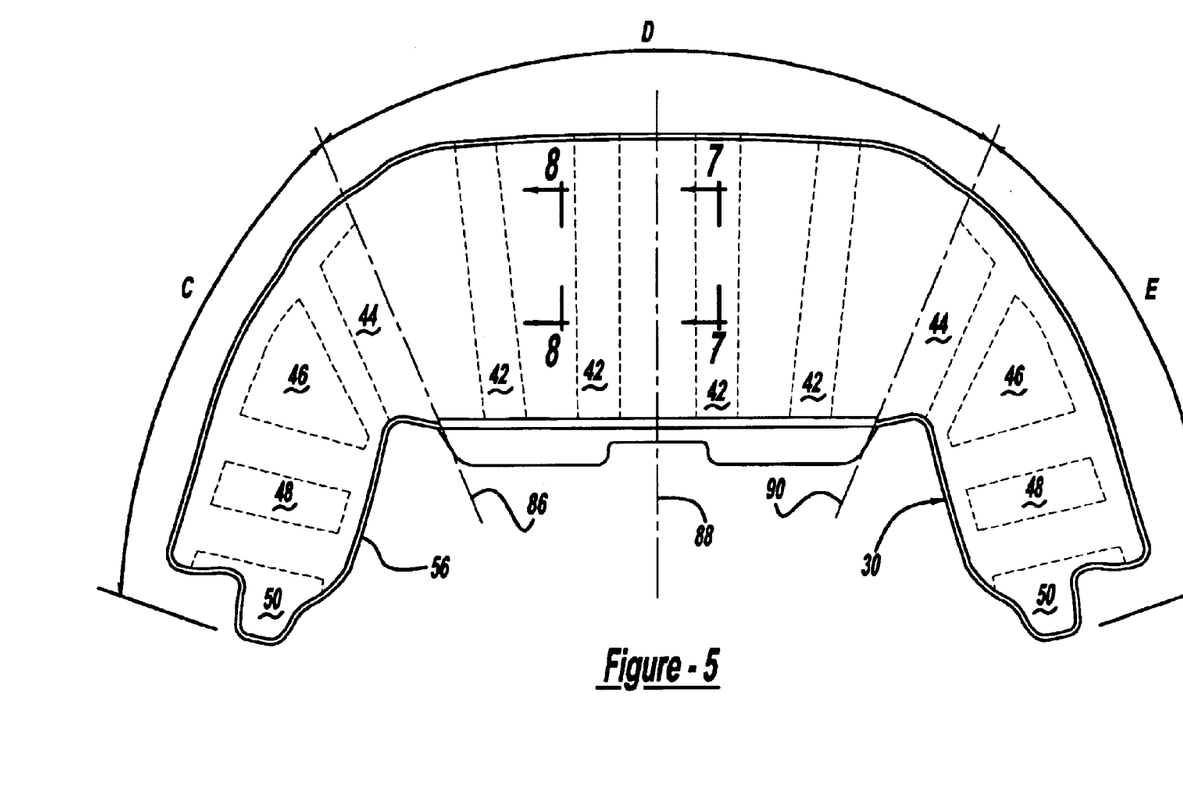
FIG. 5 is a top elevational view showing the preferred embodiment boot cover removed from the vehicle.
Figure 7:
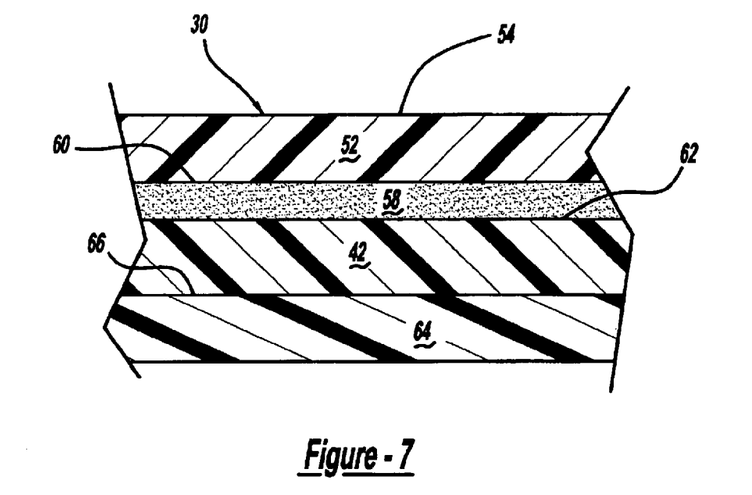
FIG. 7 is a cross sectional view taken along line 7—7 of FIG. 5, showing the preferred embodiment boot cover at a location that includes a flexible stiffener.
Figure 8:
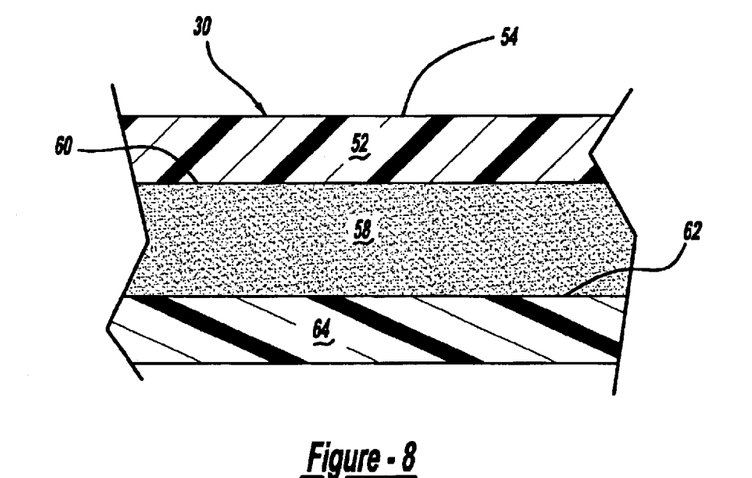
FIG. 8 is a cross sectional view taken along line 8—8 of FIG. 5, showing the preferred embodiment boot cover at a location that does not have a flexible stiffener.

As can be observed in FIGS. 5, 7, and 8, boot cover 30 is preferably constructed from multiple flexible sheets or layers of fabric materials that are laminated together to form a unified material. A series of flexible stiffeners 42–50 are strategically placed between the flexible sheets. Flexible stiffeners 42–50 function to support and give shape to boot cover 30 when attached to vehicle body 34. A top layer 52, which has an upper surface 54 that remains exposed when boot cover 30 is installed on the vehicle, is preferably made of a pliable polymeric material, such as vinyl, that resists water, ultraviolet radiation, and other environmental effects that may degrade the material's performance. Top layer 52 has an edge 56 that defines an outer periphery of boot cover 30. A second layer 58, which is preferably comprised of a resilient cushioning material, such as polyurethane foam padding, is positioned adjacent to an inside surface 60 of first layer 52. Second layer 58 has substantially the same size, shape and outer peripheral edge contour as upper layer 52.

Flexible stiffeners 42–50 are positioned adjacent to a surface 62 of second layer 58 at predetermined locations. Although not shown in FIG. 7, flexible stiffeners 44–50 are also positioned adjacent to surface 62 of second layer 58 in the same manner as flexible stiffener 42. The flexible stiffeners preferably do not cover the entire surface 62 of second layer 58 (see FIG. 5). The properties of flexible stiffener 42–50 are discussed in more detail subsequently.

A backing material 64, such as cloth, is positioned adjacent to flexible stiffeners 42–50 and second layer 58. Backing material 64 contacts both a surface 66 of flexible stiffeners 42–50, and in those regions not covered by the flexible stiffeners, surface 62 of second layer 58. The entire laminated material, consisting of top layer 52, second layer 58, cloth backing 64, and flexible stiffeners 42–50, are bonded together using any suitable means, such as adhesives or heat induced bonding.

Flexible stiffeners 42–50 are preferably made from a lightweight, resilient material, such as plastic or an engineering grade polymer. Alternatively, fiberglass or any other suitable material can also be used. Flexible stiffeners 42–50 function to support and give shape to layers 52, 58, and 64 (see FIG. 7) of boot cover 30 when the boot cover is installed on vehicle 20. Flexible stiffeners 42–50 may have either a constant thickness, or the thickness may be variable and non-uniform. Varying the thickness of the flexible stiffeners provides a means for controlling the contour of boot 30 when attached to vehicle 20. The non-uniform thickness causes flexible stiffeners 42–50 to bend asymmetrically when subjected to a bending load, with thinner sections bending more than thicker sections.

Figure 9:
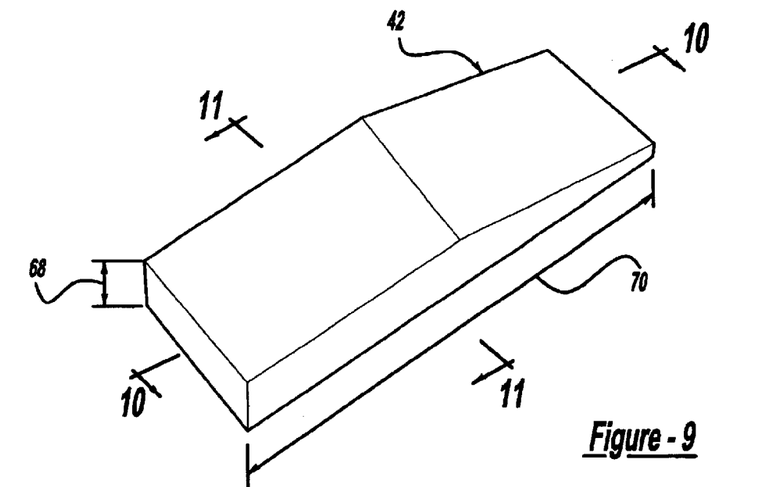
FIG. 9 is perspective view showing an exemplary flexible stiffener employed in the preferred embodiment boot cover.
Figure 10:
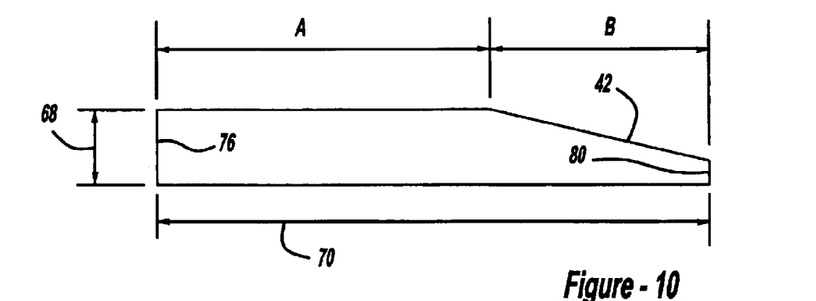
FIG. 10 is a side elevational view showing the flexible stiffener.
Figure 11:
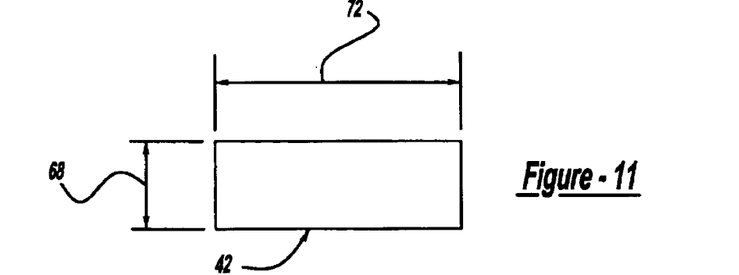
FIG. 11 is an end elevational view of the flexible stiffener.

Referring now to FIGS. 9–11, an exemplary flexible stiffener 42 is shown to have a thickness 68 that varies along a longitudinal length 70. Flexible stiffener 42 may alternatively have a thickness 68 that is does not vary along the longitudinal length 70. The thickness of flexible stiffener 42 is constant over a region "A", and decreases linearly over a region "B". As shown in FIG. 11, thickness 68 does not vary across a width 72. Flexible stiffener 42 preferably has little or no curvature when it is not subjected to a load. Despite such preference, however, it is nevertheless contemplated that flexible stiffeners having a curved shape will also fall within the scope of the present invention, provided they have a non-uniform thickness.

Figure 12:
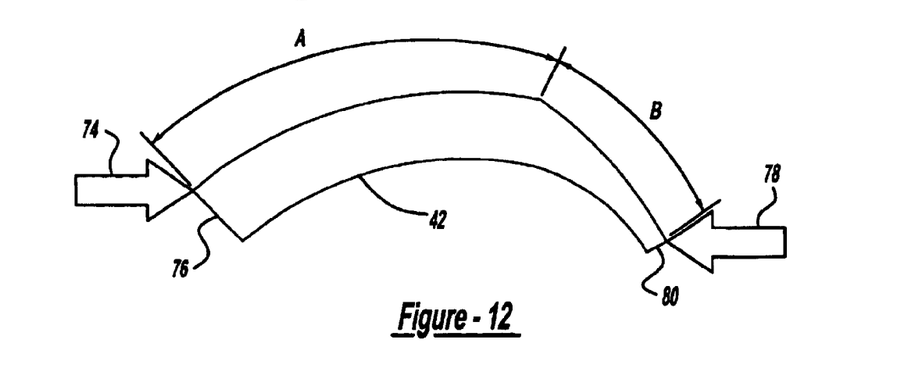
FIG. 12 is a side elevational view of the flexible stiffener employed in the preferred embodiment boot cover bending asymmetrically when subjected to a compressive load.

Referring to FIG. 12, when a compressive load 74 is applied to one end 76 of flexible stiffer 42, and an equal and opposite second load 78 is applied to an opposite end 80 of flexible stiffener 42, the non-uniform thickness causes flexible stiffener 42 to bend asymmetrically, with the thicker section of region "A" bending less than the progressively thinning section of region "B". By varying the thickness of the flexible stiffener, it is possible to achieve a multitude of boot cover contours that previously could only be achieved using rigid components that retain their shape even after the boot cover is removed from the vehicle. Applying the same compressive loads 74 and 76 to a flexible stiffener having a uniform thickness 68 (i.e., region "A" having the same thickness as region "B") will cause the flexible stiffener to bend symmetrically.

Figure 6:
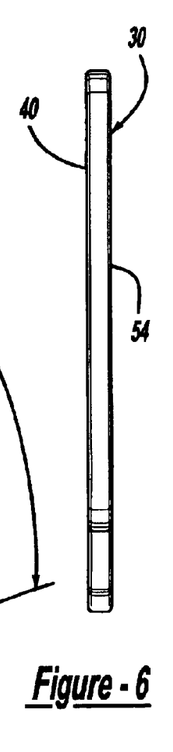
FIG. 6 is a side elevational view showing the preferred embodiment boot cover removed from the vehicle.

Referring to FIGS. 3, 5, and 6, boot cover 30 is sized larger than access opening 28. This allows boot cover 30 to curve upward and over the retracted convertible roof 22 when the boot cover is attached to vehicle body 34. Flexing boot cover 30 causes flexible stiffeners 42–50 to bend asymmetrically (see FIG. 12), thereby giving the boot cover its desired shape when installed on the vehicle. When boot cover 30 is removed from the vehicle, flexible stiffeners 42–50 return to their substantially flat shape, thereby allowing the boot cover to be spread out flat.

Boot cover 30 is folded for storage by folding the boot cover along fold lines 86, 88, and 90. Fold lines 86–90 pass between the flexible stiffeners. Although three fold lines are illustrated, it shall be appreciated that other fold lines may be used in conjunction with or in place of fold lines 86, 88, and 90. The only limitation is that a fold line not cross flexible stiffeners 42–50.

Figures 13A, 13B:
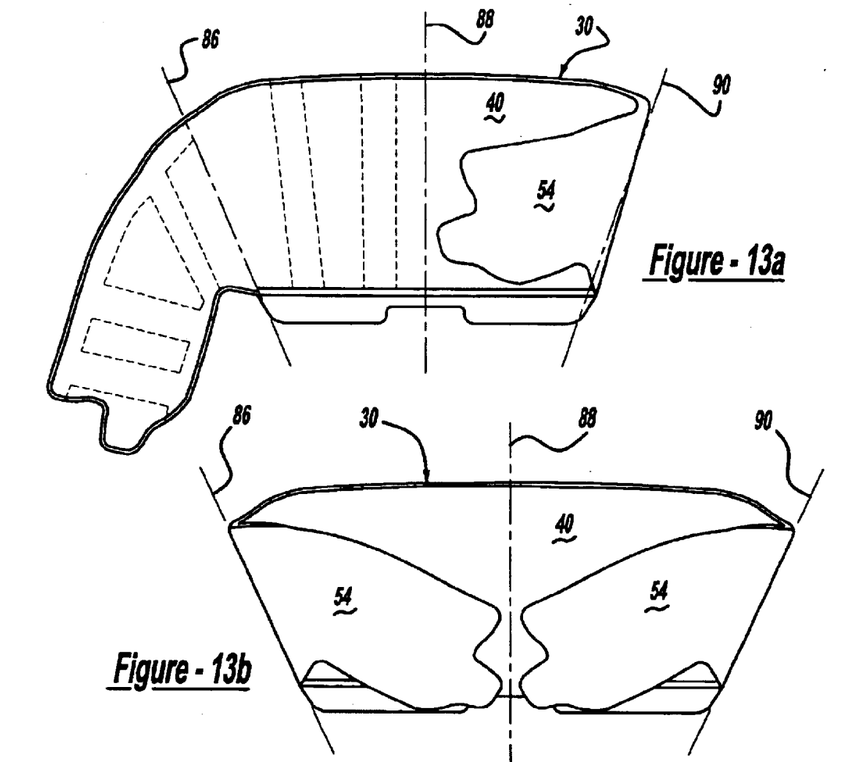
FIGS. 13a-c are diagrammatic top elevational views illustrating a series of preferred steps for folding the preferred embodiment boot cover.
Figure 13C:
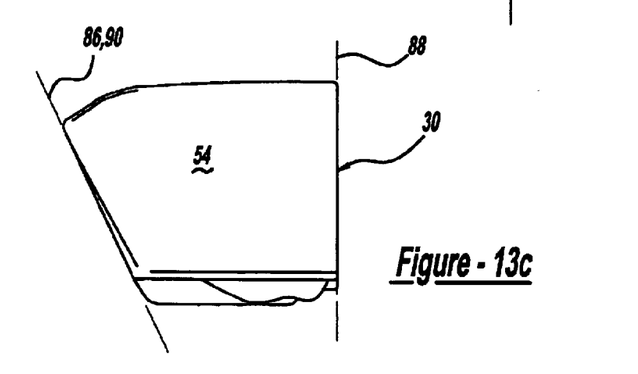
Figures 14A, 14B, 14C:
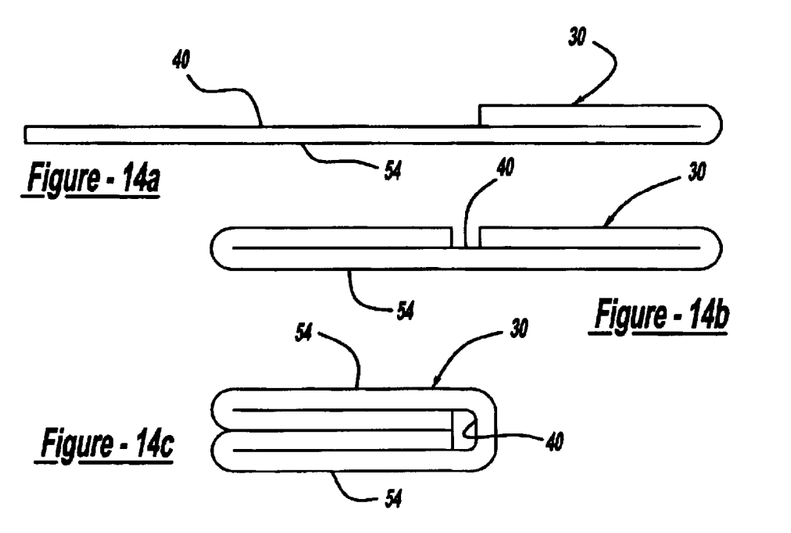
FIGS. 14a-c are diagrammatic front elevational views illustrating a series of preferred steps for folding the preferred embodiment boot cover.

Folding boot cover 30 consists of three steps. The three steps are best illustrated by dividing boot cover 30 into three separate sections "C", "D" and "E" as shown in FIG. 5. Each section has an upper surface 54 and a lower surface 40 (see FIG. 4). Referring to FIGS. 5 and 13*a*, boot cover 30 is folded by folding section "E" onto section "D" along fold line 90, such that lower surface 40 of sections "E" is positioned adjacent to and faces lower surface 40 section "D". This first step is also shown in FIG. 14*a*. A second step consists of folding section "C" onto section "D" along fold line 86, such that lower surface 40 of section "C" is positioned adjacent to and faces lower surface 40 section "D". This step is also shown in FIG. 14*b*. The folding operation is completed by folding boot cover 30 along fold line 88, such that upper surface 54 of section "C" is positioned adjacent to and faces upper surface 54 of section "E". This step is also shown in FIG. 14*c*.

While various aspects of a preferred embodiment of a flat-fold convertible boot have been disclosed, it should be appreciated that various other embodiments may be employed in combination with the present invention. For example, in addition to convertible boots, the flexible stiffeners of the present invention may also be used to provide support and give shape to a variety of other generally flexible covers. Furthermore, although the present invention discloses a flexible stiffener having a particular geometric shape, it shall be appreciated that other geometric shapes are possible and that the actual shape of a particular flexible stiffener will ultimately depend on the configuration of the boot in which the stiffener is installed and the boot contour that is to be produced. Also, the convertible roof storage compartment can be a trunk, rear seating area or mid-vehicle engine compartment. The boot cover of the present invention can be used to cover manually removable roofs and hard top roofs. Finally, while various materials have been disclosed, other materials may be readily used with equally satisfactory results. The description of the invention is merely exemplary in nature, and thus, variations that do not depart from the gist of the invention are intended to be within the scope of the invention. Such variations are not to be regarded as a departure from the spirit and scope of the invention.

What is claimed is:

1. A boot cover comprising:
    at least one flexible stiffener having a variable thickness which enables the flexible stiffener to bend asymmetrically when subjected to a bending load; and
    a flexible sheet having a section positioned adjacent to the flexible stiffener, such that flexing the flexible stiffener causes the section of the flexible sheet adjacent to the flexible stiffener to acquire substantially the same curvature as the flexed flexible stiffener.

2. The cover of claim 1, wherein the flexible stiffener has a first surface and a second surface opposite the first surface and the flexible sheet has a front face and back face, the first surface of the flexible stiffener being positioned adjacent to the back face of the flexible sheet.

3. The cover of claim 2, wherein the first surface of the flexible stiffener is attached to the back face of the flexible sheet.

4. The cover of claim 1, wherein the flexible stiffener has a first surface and a second surface opposite the first surface and the flexible sheet has a front face and back face, the second surface of the flexible stiffener being positioned adjacent to the front face of the flexible sheet.

5. The cover of claim 4, wherein the second surface of the flexible stiffener is attached to the front face of the flexible sheet.

6. The cover of claim 1, wherein applying a compressive load to opposed edge surfaces of the flexible stiffener causes the flexible stiffener to bend asymmetrically.

7. The cover of claim 1, wherein the flexible stiffener is made of at least one material selected from plastic, fiberglass, and an engineering grade polymer.

8. The cover of claim 1, wherein the flexible stiffener has a tapered thickness.

9. The cover of claim 1, wherein the flexible stiffener is substantially flat when not subjected to a bending load.

10. The cover of claim 1, wherein the cover can be folded between the flexible stiffeners.

11. The cover of claim 1, wherein the cover is operable to produce a curved surface contour when placed in a functional position and lays substantially flat when placed in a non-functional position.

12. An automotive convertible roof system comprising:
    a convertible roof movable from an open position to a stored position; and
    a convertible roof boot cover operable to cover at least a portion of the convertible roof when the convertible roof is in its stored position, the boot cover having at least one flexible stiffener that flexes when subjected to a bending load and returns to a substantially flat configuration when the bending load is removed, and a flexible sheet positioned adjacent to the at least one flexible stiffener.

13. The automotive convertible roof system of claim 12, wherein the at least one flexible stiffener has a variable thickness.

14. The automotive convertible roof system of claim 13, wherein the at least one flexible stiffener is elongated and has opposed longitudinal ends, such that applying a compressive load to the longitudinal ends of the at least one flexible stiffener causes the flexible stiffener to bend asymmetrically.

15. The automotive convertible roof system of claim 13, wherein the at least one flexible stiffener has opposed edge surfaces, such that applying a compressive load to the opposed edge surfaces causes the at least one flexibie stiffener to bend asymmetrically.

16. The automotive convertible roof system of claim 13, wherein the at least one flexible stiffener has elongated side edges, such that applying a compressive load to the side edges of the at least one flexible stiffener causes the flexible stiffener to bend asymmetrically.

17. The automotive convertible roof system of claim 12, wherein the at least one flexible stiffener has a substantially constant thickness.

18. The automotive convertible roof system of claim 17, wherein the at least one flexible stiffener is elongated and has opposed longitudinal ends, such that applying a compressive load to the longitudinal ends of the at least one flexible stiffener causes the at least one flexible stiffener to bend symmetrically.

19. The automotive convertible roof system of claim 17, wherein the at least one flexible stiffener has opposed edge surfaces, such that applying a compressive load to the opposed edge surfaces causes the at least one flexible stiffener to bend symmetrically.

20. An automotive convertible roof system comprising:
    a convertible roof movable from an open position to a stored position; and
    a convertible roof boot cover operable to cover at least a portion of the convertible roof when the convertible roof is in its stored position, the boot cover having at least one flexible stiffener that flexes when subjected to a bending load and returns to a substantially flat configuration when the bending load is removed, and a flexible sheet positioned adjacent to the at least one flexible stiffener, wherein the at least one flexible stiffener has a substantially constant thickness, wherein the at least one flexible stiffener has elongated side edges, such that applying a compressive load to the side edges of the at least one flexible stiffener causes the at least one flexible stiffener to bend symmetrically.

21. The automotive convertible roof system of claim 12, wherein flexing the at least one flexible stiffener causes a section of the at least one flexible sheet adjacent to the at least one flexible stiffener to acquire substantially the same curvature as the flexed at least one flexible stiffener.

22. The automotive convertible roof system of claim 12, wherein the flexible sheet lays substantially flat when not attached to an automotive vehicle.

23. An automotive convertible roof system comprising:
a convertible roof movable from an open position to a stored position; and
a convertible roof boot cover operable to cover at least a portion of the convertible roof when the convertible roof is in its stored position, the boot cover having at least one flexible stiffener that flexes when subjected to a bending load and returns to a substantially flat configuration when the bending load is removed, and a flexible sheet positioned adjacent to the at least one flexible stiffener, wherein the at least one flexible stiffener has a substantially constant thickness, wherein the flexible sheet can be folded between the at least one flexible stiffener.

24. The automotive convertible roof system of claim 12, wherein the contour of an outer peripheral edge of the flexible sheet has substantially a "C" shape.

25. An automotive convertible boot cover comprising:
a pliable cover; and
at least one flexible stiffener attached to the pliable cover and which bends asymmetrically when subjected to a bending load.

26. The automotive convertible boot cover of claim 25, wherein the pliable cover is further comprised of at least two layers of flexible sheets.

27. The automotive convertible boot cover of claim 26, wherein adhesive is used to bond together the at least two layers of flexible sheets.

28. The automotive convertible boot cover of claim 26, wherein heat is used to bond together the at least two layers of flexible sheets.

29. The automotive convertible boot cover of claim 26, wherein the at least two layers of flexible sheets are attached to one another along a periphery.

30. The automotive convertible boot cover of claim 26, wherein the at least one flexible stiffener is positioned between the at least two layers of flexible sheets.

31. The automotive convertible boot cover of claim 26, wherein at least one flexible sheet of the at least two layers of flexible sheets is made of a polymeric material.

32. The automotive convertible boot cover of claim 31, wherein the polymeric material is vinyl.

33. The automotive convertible boot cover of claim 26, wherein at least one flexible sheet of the at least two layers of flexible sheets is made of a resilient cushioning material.

34. The automotive convertible boot cover of claim 33, wherein the resilient cushioning material is polyurethane.

35. The automotive convertible boot cover of claim 26, wherein at least one flexible sheet of the at least two layers of flexible sheets is made of a cloth material.

36. The automotive convertible boot cover of claim 26, wherein each flexible sheet of the at least two layers of flexible sheets has substantially the same size, shape and outer peripheral edge contour as the other layers.

37. The automotive convertible boot cover of claim 25, wherein the at least one flexible stiffener has a variable thickness.

38. The automotive convertible boot cover of claim 25, wherein the at least one flexible stiffener is made of at least one material selected from plastic, fiberglass, and an engineering grade polymer.

39. The automotive convertible boot cover of claim 25, wherein a compressive load applied to opposed edge surfaces of the at least one flexible stiffener causes the flexible stiffener to bend asymmetrically.

40. The automotive convertible boot cover of claim 25, wherein the boot cover can be attached to a body of an automotive vehicle.

41. The automotive convertible boot cover of claim 40, wherein attaching the boot cover to the vehicle body causes the at least one flexible stiffener to bend asymmetrically.

42. The automotive convertible boot cover of claim 40, wherein the boot cover lays substantially flat when not attached to the automotive vehicle.

43. The automotive convertible boot cover of claim 25, wherein the boot cover can be folded between the at least one flexible stiffeners.

44. An automotive convertible boot cover comprising:
a "C" shaped pliable cover; and
at least one flexible stiffener attached to the pliable cover, wherein the at least one flexible stiffener flexes when the cover is installed and returns to a substantially flat configuration when the cover is removed.

45. The automotive convertible boot cover of claim 44, wherein the pliable cover is further comprised of the at least two layers of flexible sheets between which the at least one flexible stiffeners are positioned.

46. The automotive convertible boot cover of claim 45, wherein each of the at least two layers of flexible sheets has substantially the same size, shape and outer peripheral edge contour as the other layers.

47. The automotive convertible boot cover of claim 44, wherein the at least one flexible stiffener has a substantially constant thickness.

48. The automotive convertible boot cover of claim 44, wherein the at least one flexible stiffener is made of at least one material selected from plastic, fiberglass, and an engineering grade polymer.

49. The automotive convertible boot cover of claim 44, wherein a compressive load applied to opposed edge surfaces of the flexible stiffener causes the at least one flexible stiffener to bend symmetrically.

50. The automotive convertible boot cover of claim 44, wherein the boot cover can be attached to a body of an automotive vehicle.

51. The automotive convertible boot cover of claim of claim 50, wherein attaching the boot cover to the vehicle body causes the at least one flexible stiffener to bend symmetrically.

52. The automotive convertible boot cover of claim 50, wherein the boot cover lays substantially flat when not attached to the automotive vehicle.

53. The automotive convertible boot cover of claim 44, wherein the boot cover can be folded between the at least one flexible stiffeners.

54. A method for using a boot cover, having at least one flexible stiffener, to cover a convertible roof of an automotive vehicle that is movable between extended and retracted positions, the method comprising:
(a) placing the boot cover over the fully retracted convertible roof;

(b) applying a compressive load to opposed ends of the at least one flexible stiffeners so to cause the at least one flexible stiffeners to bend asymmetrically in an upward direction away from the retracted convertible roof; and (c) attaching a periphery of the boot cover to a body of the automotive vehicle.

55. The method of claim 54, further comprising the steps of:

(a) detaching the periphery of the boot cover from the automotive vehicle; and (b) releasing the compressive load applied to the opposed ends of the flexible stiffeners so as to cause the at least one flexible stiffeners to return to a substantially flat shape; and (c) removing the boot cover from the vehicle.

56. The method of claim 54, further comprising the steps of:

(a) flattening the boot cover; and (b) folding the boot cover along multiple fold lines that pass between the at least one flexible stiffeners.

* * * * *

UNITED STATES PATENT AND TRADEMARK OFFICE
CERTIFICATE OF CORRECTION

PATENT NO. : 6,824,195 B2
DATED : November 30, 2004
INVENTOR(S) : Carol Grunow and Rhynhardt Weimer It is certified that error appears in the above-identified patent and that said Letters Patent is hereby corrected as shown below:

<u>Title page, Item [54] and Column 1, line 1</u>,
Title, "AUTOMOBILE" should be -- AUTOMOTIVE --.

<u>Column 2</u>,
Line 44, after "is" insert -- a --.

<u>Column 4</u>,
Line 24, after "that" delete "is".

<u>Column 5</u>,
Line 6, after "40" insert -- of --.
Line 10, after "40" insert -- of --.

<u>Column 8</u>,
Line 53, after "cover" delete "of claim".

Signed and Sealed this

Nineteenth Day of April, 2005

JON W. DUDAS
*Director of the United States Patent and Trademark Office*